June 18, 1963 W. HAUSMANN ETAL 3,094,173
HYDRAULIC INSTALLATION FOR TRACTORS
Filed April 11, 1960 3 Sheets-Sheet 1

Werner Hausmann
Manfred Klose
INVENTORS.

BY

Karl F. Ross
AGENT.

June 18, 1963 W. HAUSMANN ETAL 3,094,173
HYDRAULIC INSTALLATION FOR TRACTORS
Filed April 11, 1960 3 Sheets-Sheet 2

Werner Hausmann
Manfred Klose
INVENTORS.

BY
Karl F. Ross
AGENT.

June 18, 1963 W. HAUSMANN ETAL 3,094,173
HYDRAULIC INSTALLATION FOR TRACTORS
Filed April 11, 1960 3 Sheets-Sheet 3

Werner Hausmann
Manfred Klose
 *INVENTORS.*

BY

*Karl F. Ross*
AGENT.

United States Patent Office 3,094,173
Patented June 18, 1963

3,094,173
HYDRAULIC INSTALLATION FOR TRACTORS
Werner Hausmann, Uthleben, near Nordhausen, and Manfred Klose, Nordhausen, Harz, Germany, assignors to VEB Schlepperwerk Nordhausen, Nordhausen, Harz, Germany, a corporation of Germany
Filed Apr. 11, 1960, Ser. No. 21,392
15 Claims. (Cl. 172—491)

Our present invention relates to agricultural tractors and, more particularly, to a control system for hydraulically actuated tractor accessories.

While systems adapted to control the hydraulic lifting cylinders of elevatable tractor accessories such as plows, cultivators, pulverizers and the like have long been in use, most of these systems permit only a regulated raising of the implement from engagement with the soil into an elevated position providing ground clearance for transporting the implement. The lowering of the soil-working accessory into its working position generally proceeds via a throttle built into the hydraulic control system and adapted to let down the implement at a constant rate regardless of working conditions. Since the lowering rate in such systems is a function of the viscosity of the fluid and, therefore, of its temperature, the operation of the device is dependent upon climatic conditions.

It is an object of our invention to provide a control system for agricultural tractors having means for hydraulically lowering an accessory or attachment at a plurality of selectable but individually fixed speeds.

It is another object of the present invention to provide control means for adjusting the ground pressure of the driving wheels of a tractor in order to vary the traction thereof in response to variations in ground-surface conditions.

According to a feature of the invention we provide, in a hydraulic installation for the raising and lowering of a load such as a tractor accessory, a control valve having an inlet connected to a source of pressurized hydraulic fluid (e.g. a motor-driven pump) and a rotatably or otherwise displaceable distributing member having a channel in continuous communication with the inlet, this member being selectively movable into a "raise" position, a "stop" position, a "traction" position and a "lower" position.

In the "raise" position the distributing channel is aligned with outlet means communicating with the hydraulic cylinder of the accessory, thus passing a flow of oil or other fluid under pressure into the cylinder to raise the implement. In the "stop" position the flow of fluid under pressure is shunted to a reservoir servicing the pump while the outlet means is blocked. In the "lower" position, the fluid of the hydraulic cylinder is emptied into the reservoir, at a controlled but relatively rapid rate, so that the load will respond to an external force (including that of gravity) acting on it; thus the latter position may also be designated as "neutral."

In the "traction" position the flow from the cylinder to the reservoir is overbalanced by a flow of pressurized fluid from the pump, thus establishing a pressure differential whereby the pressure acting upon the piston in the cylinder may be maintained at a positive value insufficient to lift the load off the ground. This positive pressure, acting in a load-raising sense, applies to the rear of the tractor a reaction force which urges its traction wheels more firmly into contact with the ground. This position of the valve may also be used, with the load raised, to control its descent at a rate less than that established in the "lower" or "neutral" position.

According to a more specific feature of the invention, the hydraulic cylinder is activated by the application of fluid through two conduits in parallel but drained through only one of these conduits, preferably the one of smaller cross-sectional area, to throttle the rate of descent of the implement.

The above and other objects, features and advantages of our invention will become more readily apparent from the following description, reference being made to the accompanying drawing in which.

Figure 1:
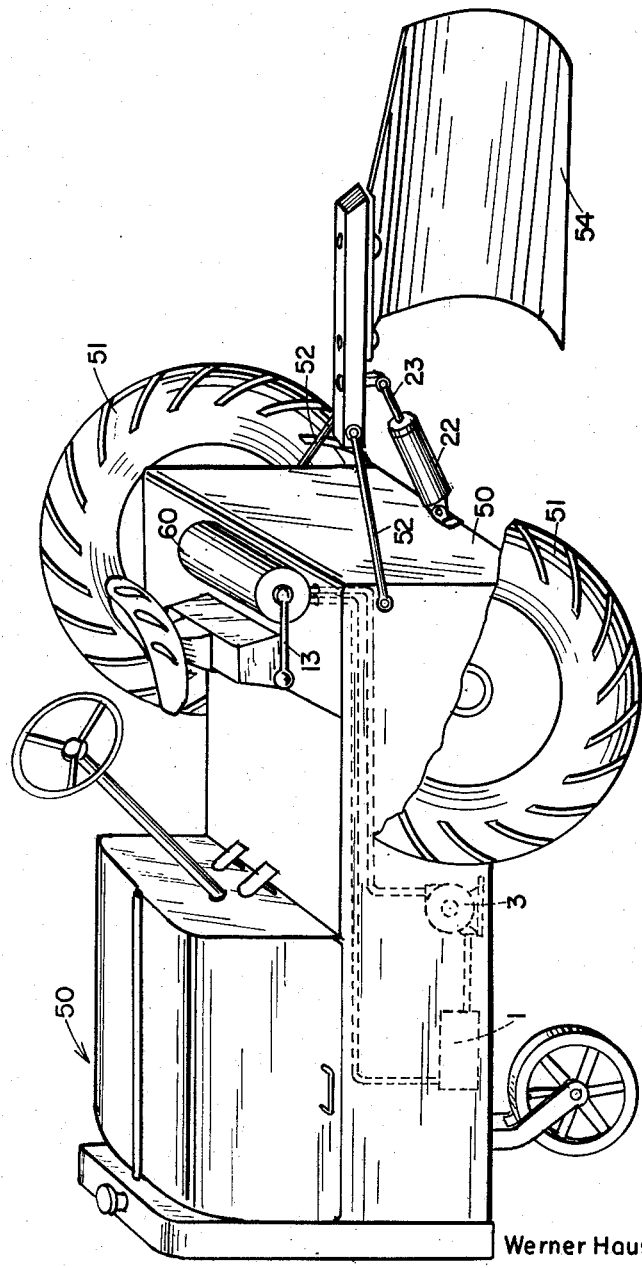
FIG. 1 is a perspective view of an agricultural tractor having an attachment hydraulically controlled by a system according to the invention.
Figure 2:
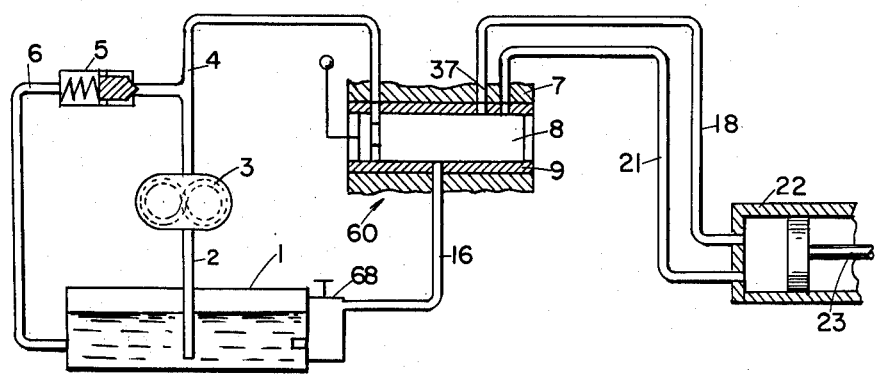
FIG. 2 is a schematic diagram of the hydraulic system.
Figure 3:
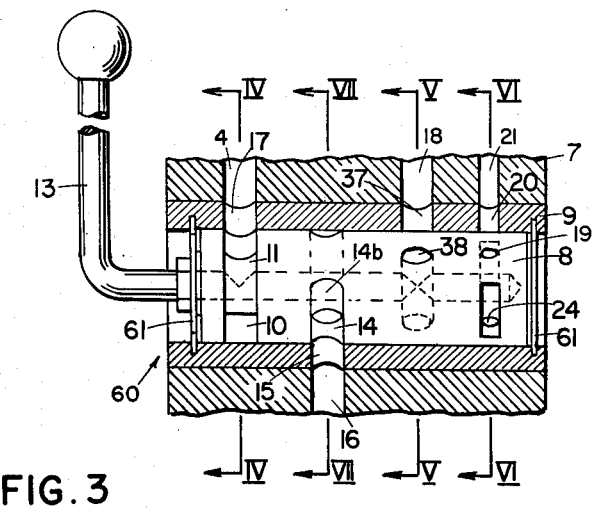
FIG. 3 is an axial cross-sectional view of a control valve forming part of this system.
Figure 4:
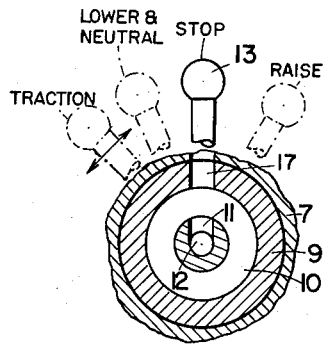
FIG. 4 is a cross-sectional view taken along line IV—IV of FIG. 3.

In FIG. 1 we show a tractor 50 whose rear wheels 51 are driven by the engine. A three-point hitch consisting of link bars 52 and a hydraulic cylinder 22 joins a load in the form of a plow 54 to the rear end of the tractor. Bars 52 are pivoted to the chassis of tractor 50 above the fulcrum of the cylinder 22 whose piston 23 bears upon the plow. The cylinder 22 is controlled by a valve 60 having a control arm 13, this valve being connected with a hydraulic pump 3 and with a fluid reservoir 1. The hydraulic system including valve 60 is illustrated schematically in FIG. 2.

The fluid reservoir 1 is linked by a conduit 2 with the hydraulic pump 3 which feeds fluid under pressure to the control valve 60 via a tube 4. A safety valve 5 is connected to this tube to shunt fluid back to the reservoir 1 via a tube 6 whenever the pressure generated by pump 3 exceeds a predetermined maximum. A return tube 16 provides a fluid path from the control valve 60 to the reservoir 1 via a regulating valve 68. A pair of outlet tubes 18 and 21 communicate with hydraulic cylinder 22, at a point below piston 23, and with control valve 60.

Control valve 60, best shown in FIGS. 3–7, comprises a valve housing 7 whose inner bore is provided with a lining 9. A valve cylinder 8 is rotatably received within the lined housing and is prevented from axial motion therein by annular retainers 61, seated in annular grooves formed in lining 9. The valve cylinder 8 is provided with an axial bore 12 blocked at one end by the control arm 13 which is threaded into the bore at its accessible extremity. The valve seat, consisting of housing 7 and lining 9, is formed with a radial bore 17 which is the terminus of inlet tube 4 in the valve 60. Bore 17 is in continuous communication with a circumferential groove 10, provided in cylinder 8, which is connected to the central bore 12 by a radial channel 11.

The housing 7 is provided with another radial bore 15, axially spaced from bore 17, which constitutes the terminus of return tube 16. In the radial plane containing bore 15, the valve cylinder 8 is formed with a radial bore 14 having circumferential extending enlargements 14a alignable with bore 15. The bore 14 also communicates with circumferential slots 14b of smaller fluid-carrying capacity.

Outlet tube 18 from cylinder 22 terminates in a radial bore 37 of housing 7, which is adapted to register with a radial bore 38 in valve cylinder 8 upon a rotary displacement thereof. The other outlet tube 21 is connected to a radial bore 20, having a smaller cross-sectional area than bore 37, similarly provided in housing 7. Bore 20 is adapted to register with a narrow radial bore 19 provided in cylinder 8, or with another bore 24 fashioned with circumferentially extending enlargements 24a at each extremity.

Figure 5:
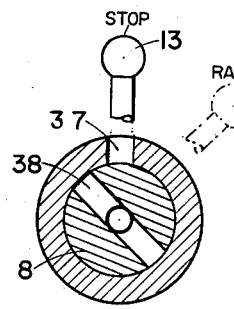
FIG. 5 is a cross-sectional view taken along line V—V of FIG. 3.
Figure 6:
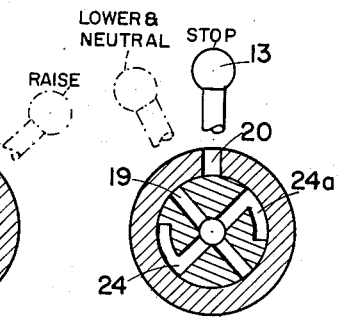
FIG. 6 is a cross-sectional view taken along line VI—VI of FIG. 3.
Figure 7:
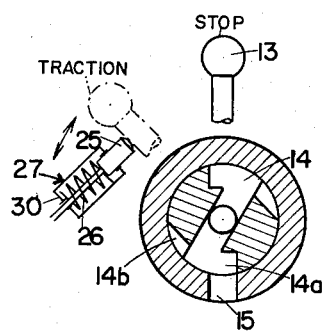
FIG. 7 is a cross-sectional view taken along line VII—VII of FIG. 3.

In operation, with the control arm in the "stop" position, fluid under pressure from pump 3 flows through bore 17, groove 10 of valve cylinder 8, central bore 12 thereof, radial bore 14, enlargement 14a and bore 15 of housing 7 (FIG. 7), and thence, via tube 16, to the reservoir. In this position, outlet bores 37 and 20 are blocked as shown in FIGS. 5 and 6.

A clockwise rotation of the valve cylinder 8 by means of arm 13 brings radial bores 37, 38 (FIG. 5) and bores 20, 19 (FIG. 6) into alignment while blocking bore 15. In this "raise" position, fluid flows under pressure from pump 3 through the central bore 12 of the valve cylinder, as described above, and thence via bores 38 and 19, through outlets 37 and 20, respectively, and then to the hydraulic cylinder 22 by way of tubes 18 and 21 in parallel. The full pressure of the pump is applied to piston 23 which is displaced to raise the plow 54 to its travel position. As piston 23 is extended, the entire plow is swung about the pivots of link bars 52 at the tractor. The plow may be locked in the raised position by displacing the arm 13 to its "stop" position whereby outlets 37 and 20 are blocked.

To lower the implement into engagement with the ground, the control arm 13 is displaced counterclockwise to the "lower" or "neutral" position wherein outlet 37 is blocked, outlet bore 20 registers with bore 24, and the bore 14 registers with bore 15. In this position, the fluid delivered by pump 3 is permitted to escape from the central bore 12 through the greatly enlarged opening 14, 14a into the reservoir via bore 15 and tube 16. Since the outlet 15 is at least of the same diameter as bore 12 and since only a negligible flow resistance is encountered en route to the reservoir 1, the fluid is substantially free-flowing as it leaves the valve. Under the weight of the plow 54, the fluid is concurrently forced from the cylinder 22 via tube 21. The discharged fluid flows through bore 24 and thence, via central bore 12, to the bore 15 where it is entrained by the return flow of the circulation from pump 3 to the reservoir 1. Since, in the "lower" position of arm 13, a direct path exists between the cylinder 22 and the reservoir 1, the implement is lowered only by the action of its weight, the speed of its descent depending upon the fluid-carrying capacity of this path and also upon the delivery rate of the pump. The implement may, in this position, be raised or adjusted manually.

Should it be desired to retard the lowering of the implement, the access to the return bore 15 can be throttled by a further displacement of arm 13 to the "traction" position, counterclockwise from the "lower" position. Arm 13 bears in its "traction" position against a resiliently yielding stop 27, schematically shown in FIG. 7, which comprises an abutment pin 25 resisting further counterclockwise displacement of arm 13 under the urging of a spring 26 supported by the stop housing 30. In the "traction" position, the bore 15 communicates with the restricted spur 14b, of bore 14, and only partly with this bore itself, whereby the return flow from the cylinder via tube 21 and bore 20, now occurring through spur 24a of bore 24, is bucked by a flow of fluid under pressure from the pump 3. Since part of the oncoming fluid is still being drained to the reservoir, a pressure differential is established in axial bore 12 and, therefore, in the region below piston 23, the direction of the differential pressure being positive (i.e., tending to lift the load off the ground) but insufficient to overcome the weight of the implement 54 so that the latter is lowered at a relatively slow rate. Spur 14b is tapered so that still further displacement of the arm 13 in a counterclockwise direction, against the opposing action of stop 27, will gradually reduce the flow of the fluid to the reservoir, thereby slowing the descent of the implement almost to a stop.

Generally, however, the "traction" position of the control valve is employed to apply an additional load to the rear or driving wheels 51 of the tractor. Since the plow 54 is lowered to its extreme bottom position in the field, no additional fluid is returned from the cylinder to the reservoir. Thus, with the return of the flow of fluid under pressure to the reservoir 1 restricted in the manner described, but not cut off entirely as in the "raise" position, a portion of the pump pressure is brought to bear upon piston 23. The reaction caused by this partial pressure applies a downward force, equal and opposite to the lifting force, to the rear wheels of the tractor, thereby increasing traction. The stop 27 is adjustably mounted on the valve housing to enable the selection of a specific lowering speed in a position in which no additional force is brought to bear upon the arm 13.

Figure 8:
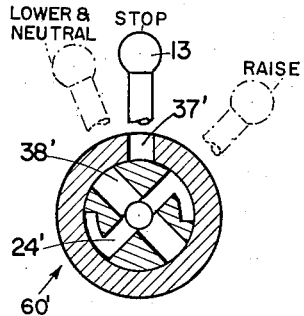
FIG. 8 is a view similar to FIG. 6 of a modified valve.

In FIG. 8 we show a modified valve 60' in a view similar to that of FIG. 5. In the modified valve, a single outlet bore 37' is provided to connect the valve with the hydraulic cylinder. The cylinder bores 38 and 24 are then united in a single plane and correspond to the bores 38' and 24', respectively. The operation of the modified valve is analogous to that of the afore described embodiment, the throttling in the "lower" and "traction" positions being effected through the narrow bore 24' while the bore 37' is equivalent in carrying capacity to both bores 20 and 37. In the "raise" position the entire flow of fluid passes through bore 38', in contradistinction to the operation of valve 60 wherein the flow in the "raise" position passes through bores 38 and 24 in parallel.

Figure 9:
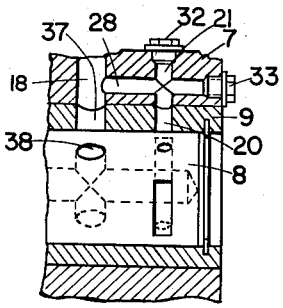
FIG. 9 is a view similar to FIG. 3 illustrating another type of valve usable in a system according to the invention.

In FIG. 9 we show a modification of valve 60, wherein bores 37 and 20 are linked by a passage 28 in housing 7 so that the two parallel fluid paths may be united. We thus dispense with tube 21, so that bore 20 may be provided with a cap 32. Another cap 33 covers the open extremity of the passage 28.

It will be apparent from the foregoing disclosure that the embodiments specifically described and illustrated may be modified in various ways which will be readily apparent to persons skilled in the art. Thus, for example, the generally Z-shaped passage represented by the radial bore 24 and its spur 24a may be combined with the radial bore 19 into a single passage alignable with port 20 whereas the bore 14 with its extensions 14a, 14b may be conversely divided into a plurality of radially extending passages alignable with outlet 15. It will also be understood that a valve member such as cylinder 8 may be modified to assume its several operating positions by axial rather than angular displacement. These and other modifications are, therefore, intended to be included within the spirit and scope of the invention except as further limited by the appended claims.

We claim:

1. A distributor for the control of a hydraulically operable power unit, comprising a housing with an inlet port connectable to a source of hydraulic fluid, an outlet port connectable to a reservoir for said fluid and at least one further port connectable to a piston cylinder of the power unit, and a valve member displaceably mounted in said housing; said valve member being provided with a channel and a plurality of passages communicating with said channel and respectively alignable with said ports in different operating positions of said valve member; said passages including at least one first passage registering with said inlet port in a first position, a second position and a third position, a second passage of relatively wide cross-section registering with said outlet port in said second position, a third passage of relatively restricted cross-section registering with said outlet port in said third position, and at least one fourth passage registering with said further port in each of said positions, said passages being so dimensioned as to enable fluid from said cylinder, admitted into same from said source in said first position by way of said inlet and further ports, to be discharged via said outlet port in said second position while creating in said third position a pressure differential in said channel exerting upon a piston in said cylinder a hydraulic force substantially less than that exerted thereon in said first position.

2. A distributor according to claim 1 wherein said second passage is in the form of a bore in said valve member, said third passage forming a peripheral spur of said bore.

3. A distributor according to claim 2 wherein said spur diminishes in width with increasing distance from said bore, said valve member being displaceable into a plurality of contiguous positions beyond said third position in which the magnitude of said hydraulic force is progressively increased by the diminishing outflow of said fluid through said outlet port via a restricted part of said spur.

4. A distributor according to claim 3, further comprising resilient stop means yieldably arresting said valve member in said third position while permitting its further displacement into said contiguous positions.

5. A distributor according to claim 1 wherein said valve member is rotatable in said housing, said first passage comprising an annular groove on said valve member.

6. A distributor according to claim 1 wherein said housing is provided with an additional port connectable to said cylinder, said valve member being provided with a fifth passage registering with said additional port in said first position for the admission of further fluid from said source to said cylinder.

7. A distributor according to claim 6 wherein said fifth passage and said additional port are of larger fluid-carrying capacity than said fourth passage and said further port.

8. A distributor according to claim 1 wherein said valve member is provided with a stop position in which said further port is cut off from said channel.

9. A distributor for the control of a hydraulically operable power unit, comprising a housing with an inlet port connectable to a source of hydraulic fluid, an outlet port connectable to a reservoir for said fluid and at least one further port connectable to a piston cylinder of said power unit, and a valve member displaceably mounted in said housing; said valve member being provided with a channel and a plurality of passages communicating with said channel and respectively alignable with said ports in different operating positions of said valve member; said passages including at least one first passage registering with said inlet port in a first position, a second position and a plurality of contiguous positions, a second passage of relatively wide cross-section registering with said outlet port in said second position, a third passage of relatively restricted cross-section registering to a progressively diminishing extent with said outlet port in said contiguous positions, and at least one fourth passage registering with said further port in each of said positions, said passages being so dimensioned as to enable fluid from said cylinder, admitted into same from said source in said first position by way of said inlet and further ports, to be discharged via said outlet port in said second position while creating in any of said contiguous positions a pressure differential in said channel exerting upon said piston a hydraulic force substantially less than that exerted thereon in said first position.

10. A distributor according to claim 9, further comprising resilient stop means yieldably engaging said valve member in one of said contiguous positions and permitting its further displacement into the remaining contiguous positions.

11. A distributor for the control of a hydraulically operable power unit, comprising a housing with an inlet port connectable to a source of hydraulic fluid, an outlet port connectable to a reservoir for said fluid and two further ports connectable to a piston cylinder of said power unit, and a valve member displaceably mounted in said housing; said valve member being provided with a channel and a plurality of passages communicating with said channel and respectively alignable with said ports in different operating positions of said valve member; said passages including at least one first passage registering with said inlet port in a first position, a second position and a third position, a second passage of relatively wide cross-section registering with said outlet port in said second position, a third passage of relatively restricted cross-section registering with said outlet port in said third position, a relatively wide fourth passage registering with one of said further ports in at least said second and third positions and forming with it a path of relatively large fluid-carrying capacity, and a relatively narrow fifth passage registering with the other of said further ports in said raising position and forming with it a path of relatively small fluid-carrying capacity, said passages being so dimensioned as to enable fluid from said cylinder, admitted into same from said source in said first position by way of said inlet and further ports, to be discharged via said outlet port in said second position while creating in said third position a pressure differential in said channel exerting upon said piston a hydraulic force substantially less than that exerted thereon in said first position.

12. A distributor according to claim 11 wherein said valve member is cylindrical and rotatable in said housing, said fourth and fifth passages being axially offset from each other.

13. A distributor according to claim 11 wherein said valve member is provided with a stop position in which both of said further ports are cut off from said channel.

14. A mechanism for controlling a load attached to a tractor at a location adjacent a set of driven wheels for generally vertical motion relative to the tractor body, comprising a hydraulic cylinder secured to the tractor body, a piston connected with the load and slidable in said cylinder, conduit means on said cylinder connectable to a source of hydraulic fluid under pressure and to a reservoir for said fluid whereby said load may be selectively raised and lowered, and valve means in said conduit means having a throttling position for selectively limiting the flow of said fluid to said reservoir and for admitting said fluid to said cylinder at a reduced rate adapted to exert upon said piston a positive lifting force insufficient to overcome the weight of said load but augmenting the traction pressure of said driven wheels.

15. A mechanism according to claim 14, further comprising handle means for displacing said valve means into said throttling position and resilient means coupled with said handle means in a manner tending to oppose such displacement.

References Cited in the file of this patent

UNITED STATES PATENTS

| | | |
|---|---|---|
| 2,165,096 | Frechette | July 4, 1939 |
| 2,667,745 | Smith et al. | Feb. 2, 1954 |
| 2,724,408 | Trevaskis et al. | Nov. 22, 1955 |
| 2,765,808 | Tydeman | Oct. 9, 1956 |
| 2,911,006 | Vogel | Nov. 3, 1959 |
| 2,935,089 | Christie | May 3, 1960 |
| 3,015,344 | Hausmann et al. | Jan. 2, 1962 |

FOREIGN PATENTS

| | | |
|---|---|---|
| 666,571 | Great Britain | Feb. 13, 1952 |